Aug. 22, 1967  D. W. KERMODE  3,336,799
FREE-FLOATING APPARATUS FOR MEASURING AND
TELEMETERING SEA-WAVE CHARACTERISTICS
Filed Sept. 14, 1964  2 Sheets-Sheet 1

DAVID W. KERMODE
*INVENTOR.*

BY  V. C. MULLER
ATTORNEY.

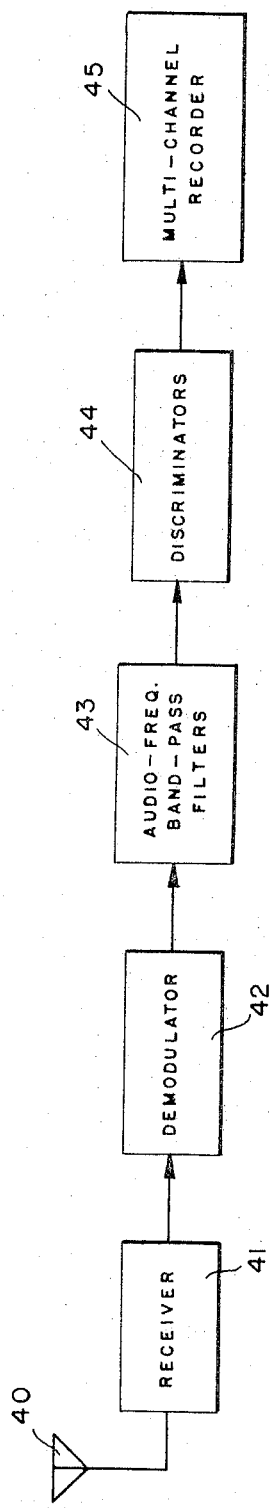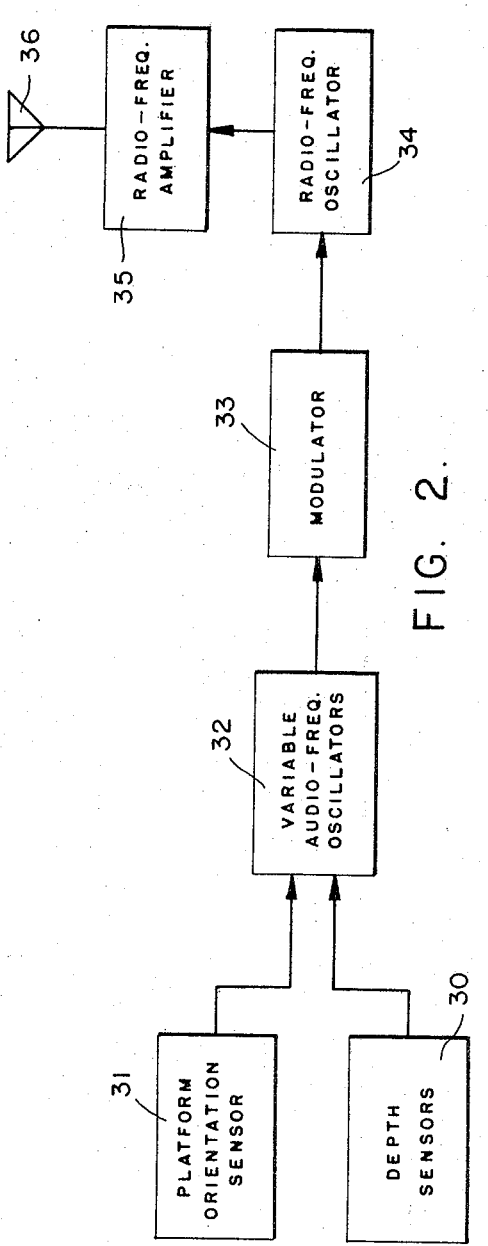

3,336,799
FREE-FLOATING APPARATUS FOR MEASURING AND TELEMETERING SEA-WAVE CHARACTERISTICS
David W. Kermode, Ridgecrest, Calif.
(Box 5156, China Lake, Calif. 93555)
Filed Sept. 14, 1964, Ser. No. 396,446
1 Claim. (Cl. 73—170)

ABSTRACT OF THE DISCLOSURE

Apparatus senses wave height variations at corners of a regular polygon and also the azimuth of a reference line on the apparatus. The variations with time are recorded at a remote locus and by data reduction, various wave characteristics are continuously determined.

---

The invention described herein may be manufactured and used by or for the Government of the United States of America for governmental purposes without the payment of any royalties thereon or therefor.

The present invention relates to sea-wave measuring and telemetering systems, and more particularly to a sea-wave measuring and telemetering system having a free-floating apparatus (rather than a fixed-placement apparatus) for sensing of sea-wave characteristics.

While there are available several types of apparatus and techniques adapted for measurement specifically of sea-wave direction in addition to other variables such as sea-wave height (amplitude), speed and period, such apparatus and techniques are limited by their fixed-placement requirements or operational capabilities and characteristics to only near-shore measurement of waves in water regions having depths no greater than say about one hundred feet. No fully satisfactory techniques and apparatus appear to have been developed for measurement of sea-wave characteristics, specifically including sea-wave directions, in distant deep-water areas; sea-wave lengths and periods can be estimated or calculated from shipboard observations with little difficulty and with a fair degree of accuracy (if the waves are upwards of twenty feet or so long), but shipboard estimates or calculations of heights of waves at sea are notoriously unreliable; sea-wave data determinations involving use of aircraft and airborne apparatus entail many difficulties and considerable expense.

It is therefore a primary object of the present invention to provide a novel and comparatively inexpensive apparatus, suitable for use in free-floating manner in deep-water regions rather than requiring fixed placement or tethering, for determining with reasonable accuracy sea-wave direction in addition to other sea-wave variables.

It is another object of the invention to provide a sea-wave measuring and telemetering system, including an apparatus adapted for use in free-floating manner in deep-water regions, for sensing characteristics of sea-waves at distant deep-water locations and for recording such characteristics at a remote station.

Other objects and attendant advantages of this invention will be readily appreciated as the same becomes better understood by reference to the following detailed description when considered in connection with the accompanying drawing wherein:

FIG. 2 is a block diagram of an exemplary telemetering transmitter associated with the platform-orientation and sea-wave sensors;

FIG. 3 is a block diagram of a telemetering receiver and recording apparatus for use in connection with the FIG. 2 telemetering transmitter apparatus.

In accordance with the present invention, there is provided a supporting-platform, in this instance basically of inverted, square-based, pyramidal configuration, carrying an array of vertically-elongated sea-wave sensing devices, a platform-orientation (and correspondingly array-orientation) sensing device, and telemetering transmitter apparatus; the platform in this instance includes an erect pyramidal superstructure, mounted upon the inverted pyramidal structure in base-to-base manner, for the purpose of supporting above water a housing for the orientation-sensing device and the telemetering transmitter apparatus, and for supporting a center-positioned sea-wave sensor. Each sea-wave sensor functions to yield variations of any selected electrical quantity (for example resistance variations) corresponding to sea-wave surface height variations relative to the mean level during sea-wave passage at the location of that sensor. The platform is arranged to be free-floating in contradistinction to requiring fixed placement or tethering, and to be of such buoyancy as to normally have its inverted pyramidal structure nearly entirely submerged, during undisturbed seawater condition. The platform is further characterized by being specifically adapted to have its base-plane remain substantially horizontal and at substantially constant elevation relative to the mean level of the surrounding seawater despite wave action; this is accomplished by providing ballast and a comparatively large sea anchor or damping structure fixed to the lowermost extremity of the platform, and by providing the platform with float structures which are vertically elongated and having such buoyancy relative to the weight of the complete apparatus that the float structures are nearly awash in an undisturbed sea state; the platform is thus only slightly positively buoyant, changes buoyancy very little during sea-wave passage, and presents considerable inertia and damping action, consequently restricting vertical and pivotal displacements to comparatively small magnitudes during wave passage.

Figure 1:
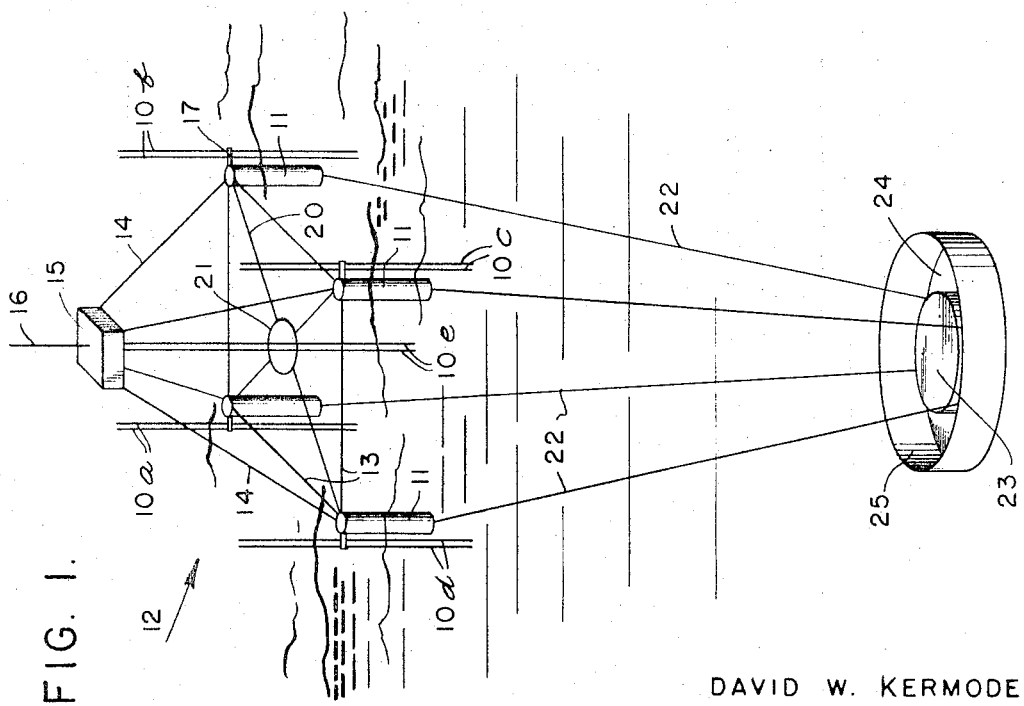
FIG. 1 illustrates schematically a free-flowing apparatus including a sensor-supporting platform, platform-orientation and sea-wave sensors, and telemetering apparatus, in accordance with the invention.

The exemplary embodiment illustrated in FIG. 1 employs what may be termed a square array of sea-wave sensing devices, comprising four corner-positioned sensors 10a, 10b, 10c and 10d, and a center-positioned sensor 10e. The sea-wave sensors 10a to 10d are mounted adjacent to the vertically-elongated floats 11 secured to or forming part of the supporting-platform 12. Supporting-platform 12 is here shown simply in schematic framework form and other elements of the apparatus are likewise shown in schematic manner, rather than to present complicating details which would tend to obscure the invention and which are unnecessary to a complete understanding thereof. The square base common to the pyramidal structures of platform 12 is formed by the horizontal members 13, the lateral members 14 completing the erect pyramidal structure. The superstructure supports housing 15 which encloses the orientation-sensing device and telemetering transmitter apparatus, the transmitter antenna being indicated at 16. Housing 15 further serves to support the center-positioned sensor 10e. Sensors 10a to 10d are supported at the corners of platform 12 by means of any suitable type of brackets 17, in this instance secured to and extending from floats 11 as indicated. The square base formed by members 13 is braced by cross-members 20 which terminate at a centrally-located circular member 21 to avoid interference with sensor 10e. Lateral members 22 complete the submerged inverted pyramidal structure. Ballast 23 and the damping structure comprising bottom member 24 and cylindrical member 25 are secured to the lowermost portion of the inverted pyramidal structure for purposes as described.

It is to be understood that the particular dimensions to be employed for the various elements of the disclosed apparatus are matters simply of engineering design, in part dependent upon the seawater region in which the apparatus is to be employed and upon the expected or desired range of sea-wave characteristics to be measured. Similarly, while the sensors 10a to 10e are here shown as somewhat shorter than the sides of the square base of the pyramidal platform, they may in fact be very much longer, and correspondingly, while the superstructure is here shown as of smaller height than the inverted pyramidal structure, a reverse height relationship may be employed since the superstructure is readily made comparatively light and the supporting platform can easily be designed to maintain its center of gravity below the center of buoyancy.

While various different types of sea-wave sensing devices can be employed without departing from the invention, sensors 10a to 10e are here indicated as taking the form of pairs of rigidly-spaced parallel rods (or tubes) of conductive material, preferably of non-corrosive metal, the resistance presented by any pair, as measured at its upper ends, varying inversely with the depth to which that pair is submerged in seawater during wave passage. Such sea-wave sensors are therefore equivalently termed depth sensors. The upper ends of each of these depth sensors 10a to 10d are connected by a pair of insulated wires (not shown) to suitable conversion circuits contained within housing 15, and similarly the upper ends of sensor 10e are to be understood as likewise connected to conversion circuitry in housing 15. The resistance variations (corresponding to seawave-height variations at the sensor positions during wave passage) presented by sensors 10a to 10e, also sensor-array orientation or direction, are sensed and telemetered to a remotely-located station by means of suitable apparatus contained within housing 15, and such sensing and telemetering may be provided by means of entirely conventional components, block-diagrammed in FIG. 2.

Referring to FIG. 2, the array of the five depth sensors (10a to 10e, FIG. 1) providing five channels of sea-wave information are here to be understood as represented by block 30, and platform orientation sensor 31 providing a single channel of direction information is to be understood as mounted within housing 15 (FIG. 1) and of any conventional type adapted to provide an electrical variation corresponding to the direction in which any selected platform reference line in the sensor array points, for example the pointing direction of say a platform reference line extending from sensor 10d through sensor 10a. Block 32 in this instance represents a set of six audio-frequency oscillators yielding output signals having different and sufficiently spaced center-frequencies, and adapted to shift their output signal frequencies, under control of depth sensors 30 and platform orientation sensor 31, in sense and to an extent corresponding to the sense and magnitude by which the depth sensors depart from their normal submergence depth and by which the reference line direction departs from north; it is to be understood that the separate and distinct bands of operation of the several audio-frequency oscillators grouped in block 32 are sufficiently spaced to avoid cross-interference. Modulator 33 is likewise to be understood as including a linear mixer, in accordance with conventional multiplexing technique employed in radio telemetry systems, operating to impress the several output signals of oscillators 32 upon a radio-frequency carrier signal as generated by oscillator 34. The resultant modulated and amplified radio-frequency carrier signal as delivered by amplifier 35 is radiated by antenna 36 which is preferably of omnidirectional type.

In FIG. 3, illustrating simplified conventional type of telemetering system receiver equipment which can be employed in association with the FIGURE 2 telemetering transmitter equipment, antenna 40 may be of directional type to increase the effective sensitivity of the receiver system. Receiver 41 operates at the carrier radio-frequency of the telemetering transmitter (FIG. 2), and demodulator 42 associated with receiver 41 extracts and delivers the composite modulation signal to a set of six audio-frequency band-pass filters represented by block 43, the latter operating to separate or isolate the six distinct audio-frequency modulation signals and deliver them to a set of six discriminators (corresponding to the five channels of sea-wave information and the sixth channel of sensor-array orientation information) represented by block 44. The discriminators function to convert the input audio-frequency signals to direct voltages, varying in polarity and magnitude in accordance with the sense and magnitude of departure of the modulation signals from their normal or center-frequency values, thus corresponding to the sense and magnitude by which the depth sensors depart from their normal submergence depth and by which the platform reference line direction departs from north. The six channels of resultant direct voltages are applied to multi-channel recorder 45, operating to provide a strip-chart 46 as depicted generally in FIG. 4.

Figure 4:
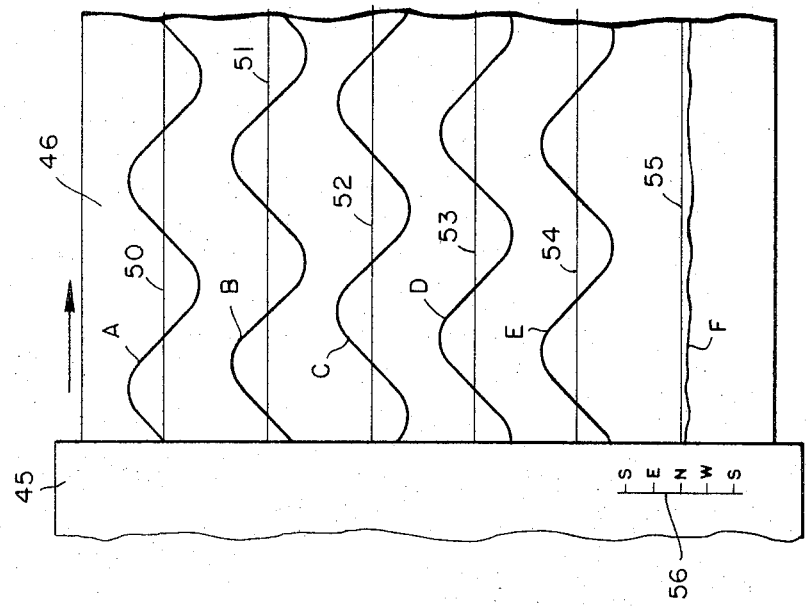
FIG. 4 depicts generally the type of record obtained by use of the apparatus illustrated in FIGS. 1, 2 and 3.

Referring to the strip-chart recorder 45 and chart 46 as shown in FIG. 4, in which time increases toward the left since, as indicated, the strip-chart moves toward the right past the recorder writing pens (hidden from view), the sea-wave graphs A to E (here shown in idealized form) correspond to sensor depth variations as experienced during wave passage at sensors 10a to 10e, respectively, the mean levels of these depth variations being indicated by the reference lines 50 to 54, respectively. The platform-orientation graph F, displaced from the north-representing reference line 55 in sense and to an extent dependent upon the direction of a platform reference line extending, as previously mentioned, from say depth sensor 10d through depth sensor 10a (FIG. 1), may be read relative to the calibrated scale 56 which is here shown as marked directly upon the recorder body. In this particular instance the platform reference line direction is seen to be generally north of northwest.

It will be understood that interpretations of the several graphs to yield determinations of sea-wave height, direction, and period or velocity and wavelength, are dependent simply upon the engineering design, calibration adjustment of the various components of the complete system, and upon suitable reduction of the data provided by the disclosed system. Simply by way of example, for a strip-chart speed of say ¼ inch per second, and for a chart distance between wave peaks of say about 1.5 inches, the wave period would be about 6.0 seconds; for a strip-chart wave height calibration of say 24 feet per inch, and for a chart distance of say ¼ inch between a given wave peak and its mean-level reference line, the wave-amplitude would be 6 feet. As to wave direction, examination of the wave graphs A to D shows that their peaks occur in the order C–D–B–A, at relative intervals which in this instance are substantially equal, corresponding to wave advance in a direction displaced about 25 degrees west of the platform reference line, therefore (taking into consideration the pointing direction of the platform reference line as given by graph F) in a direction approximately northwest. Further, in the case of depth-sensor spacing of say 4 feet as measured along the sides of the platform base, and where the spacing between peaks of wave graphs A and C is say about ½ inch, and taking into account the wave advance direction relative to the sensor array, the wave velocity can be calculated to be about 11 feet per second. Similarly, the wave length corresponding to the assumed conditions can be calculated to be about 66 feet.

While the foregoing example of data reduction has been limited to use of sea-wave information as provided by the corner sensors 10a to 10d of the illustrated apparatus, in addition of course to the platform reference line direction, it should be recognized that the additional provision of a center-positioned sensor 10e for another channel of sea-wave information, and in some cases summing or averaging of the sea-wave information provided by the corner sensors 10a to 10d, can be useful in making it possible to employ other data reduction techniques for determining sea-wave characteristics with possibly greater accuracy, still coming under the present invention which basically concerns the concept of providing a suitable array of spaced, separately identifiable, sea-wave height sensors which, in association with a stabilized free-floating platform and an array-orientation sensor, enables determination of sea-wave direction in addition to other sea-wave characteristics. Again, the invention is not limited to use of the particular depth sensors detailed herein by way of example, but may of course employ any other suitable type of sea-wave height sensors. Further, many modifications of the supporting platform and of the sensor array will now become apparent in view of the foregoing description; for example, a triangular-based pyramidal structure may be employed, supporting an equilateral triangular array of sea-water height sensors which, together with an array-orientation sensing device, would suffice to enable determination of sea-wave characteristics by use of data reduction techniques which will now be apparent; again, flotation of the sea-anchored and ballasted platform may be accomplished by providing the submerged lateral legs of the framework in the form of hermetically sealed tubes of suitable length and diametral dimensions to yield slight positive buoyancy as described. Also, it will now be apparent that any desired type of telemetry and recording equipment may be employed in association with the stabilized, free-floating supporting-platform and sensor array.

Obviously many modifications and variations of the present invention are possible in the light of the above teachings. It is therefore to be understood that within the scope of the appended claim the invention may be practiced otherwise than as specifically described.

What is claimed is:

Apparatus for determining characteristics of waves, such as direction, height, and velocity in a selected water region, said apparatus comprising, in combination:

(a) an array consisting of a water-height sensor disposed at each corner of a regular polygon;
(b) stabilized free-floating means supporting said sensor array at substantially constant height relative to the mean level of surrounding water during wave action adapted to freely rotate about a vertical axis;
(c) each sensor yielding variations, independent of the others, of an electrical quantity, corresponding to water surface height variations, at the location of that sensor, relaitve to said mean level;
(d) means responsive to each of said sensors to provide a plurality of signals equal to the number of corners of the polygon corresponding to surface height variations at said sensors and separately identifying the sensors giving rise to said signals,
(e) means to provide a signal corresponding to the azimuthal direction of said free floating means, which signal thus corresponds to the azimuthal positions of the sensors about said axis, and
(f) means to continuously telemeter all of said signals to a remote locus and record same thereat, to thereby provide data indicative of the instantaneous water height at each sensor and the azimuth thereof, which data is subject to reduction to determine said characteristics.

References Cited

UNITED STATES PATENTS

| | | | |
|---|---|---|---|
| 138,293 | 4/1873 | Stoner | 9—8 |
| 2,447,069 | 8/1948 | Holcomb | 177—386 |
| 2,761,320 | 9/1956 | Duntley | 73—170 |
| 2,768,368 | 10/1956 | Crane et al. | 340—207 |
| 3,082,608 | 3/1963 | Daniel | 9—8 X |

OTHER REFERENCES

Upham, S. H., Electric Wave Staff (U.S. Hydrographic Office Model Mk1), U.S. Hydrographic Office, Technical Report #9. Washington. March 1955. FIGURE 1 and pp. 1, 4 and 8 relied on.

JAMES J. GILL, *Acting Primary Examiner.*

RICHARD C. QUEISSER, *Examiner.*

J. J. SMITH, *Assistant Examiner.*